US012548473B2

(12) United States Patent
Huff

(10) Patent No.: US 12,548,473 B2
(45) Date of Patent: Feb. 10, 2026

(54) FLEXIBLE LABEL AND BOTTLE

(71) Applicant: Technical Response, Inc., Knoxville, TN (US)

(72) Inventor: Leonard Scott Huff, Knoxville, TN (US)

(73) Assignee: Technical Response, Inc., Knoxville, TN (US)

( * ) Notice: Subject to any disclaimer, the term of this patent is extended or adjusted under 35 U.S.C. 154(b) by 0 days.

(21) Appl. No.: 18/804,192

(22) Filed: Aug. 14, 2024

(65) Prior Publication Data

US 2025/0061819 A1 Feb. 20, 2025

(51) Int. Cl.
*G09F 3/02* (2006.01)

(52) U.S. Cl.
CPC ........ *G09F 3/02* (2013.01); *G09F 2003/0273* (2013.01)

(58) Field of Classification Search
CPC ............... G09F 3/02; G09F 2003/0272; G09F 2003/208; G09F 2003/0251; G09F 2003/0264; B65D 23/008; B65D 23/14
See application file for complete search history.

(56) References Cited

U.S. PATENT DOCUMENTS

2003/0170413 A1* 9/2003 Nakayama ......... G03G 15/6588 428/35.7
2007/0196600 A1* 8/2007 Hutchinson ............... G09F 3/02 428/34.1
2007/0252382 A1* 11/2007 Baum ..................... B32B 27/06 283/107
2010/0015374 A1* 1/2010 Fulwiler ................... B32B 7/12 428/36.5

* cited by examiner

*Primary Examiner* — Laura C Powers
(74) *Attorney, Agent, or Firm* — Luedeka Neely, P.C.

(57) ABSTRACT

A flexible label and a bottle, related to the technical field of packaging labels. The flexible label includes a flexible base arranged on an outer wall of a bottle body and a pattern layer arranged on an outer surface of the flexible base; two side edges of a width direction of the flexible base are configured to curve-shaped to make the two side edges of the flexible base arranged on the bottle body are orthographically projected as straight lines in a vertical plane. The present disclosure solves the problem in the prior art that the side edge of the label becomes bent in the length direction in a front view, affecting the user's experience and leading to decreased sales.

8 Claims, 2 Drawing Sheets

FLEXIBLE LABEL AND BOTTLE

CROSS-REFERENCE TO RELATED APPLICATIONS

The present disclosure claims priority to Chinese Patent Application No. 202322203075.7, filed on Aug. 15, 2023. The content of aforesaid application is incorporated herein by reference.

FIELD OF THE DISCLOSURE

The present disclosure relates to the technical field of packaging labels, and in particular to a flexible label and a bottle.

BACKGROUND

Bottles are commonly used as containers in daily life, such as common beverage bottles, especially a beverage bottle for drinking water or beverage after sporting, the bottle body of the beverage bottle is labeled, and in order to increase the comfort of holding, the label is set to a soft rubber form, so that when the user holds the beverage bottle and squeezes out the drink, the squeezing force is cushioned by the flexible soft rubber pad, and the grip is more comfortable.

Due to the characteristics of bottle usage, in the prior art, the soft rubber does not completely cover the outer wall of the bottle. Instead, a single piece or multiple pieces of soft rubber are usually set at intervals around the bottle. Additionally, the cross-section of the bottle is an irregular curved surface in the length direction. In the prior art, the soft rubbers are typically injection molded, with the side edges being straight lines. When the soft rubber is adhered to the bottle, the straight-line side edges bend and deform along the curved contour of the bottle in a length direction, forming an illusion of deformation in the shape of the label on the bottle in a front view. This causes users to have concerns about the product quality, affecting user experience and leading to decreased sales.

Therefore, the existing technology still needs to be improved and developed.

BRIEF SUMMARY OF THE DISCLOSURE

In view of the defects of the prior art, the purpose of the present disclosure is to provide a flexible label and a bottle to solve the problem in the prior art that the side edge of the label becomes bent in the length direction in a front view, affecting the user's experience and resulting in reduced sales. The technical solutions adopted by the present disclosure are as set forth herein.

In a first aspect, the present disclosure provides a flexible label, which includes a flexible base arranged on an outer wall of a bottle body, and a pattern layer arranged on an outer surface of the flexible base, wherein the two side edges of a width direction of the flexible base are curve-shaped to make the two side edges of the flexible base arranged on the bottle body are orthographically projected as straight lines in a vertical plane.

In some embodiments, the flexible base has an unfolded state, and the outer surface of the flexible base is a plane in the unfolded state.

In some embodiments, the side edge in the width direction of the flexible base includes two end segments arranged at two ends of a length direction of the flexible base, and a concave segment arranged between the two end segments and connected to the two end segments, and the concave segment is bent toward a center of the flexible base.

In some embodiments, the surface of the flexible base is arranged with a textured structure, and a pattern layer is covered on an upper surface of the textured structure.

In some embodiments, the textured structure is an embossed concave-convex structure or a laser concave-convex structure.

In some embodiments, the flexible base is selected from the group consisting of a thermoplastic elastic base, a rubber base, and a silicone base;

In some embodiments, a hardness of the flexible base is Shore A 30-80 degree.

In some embodiments, the pattern layer is a digital printing pattern layer, an ink printing pattern layer, a spraying pattern layer or a thermal transfer pattern layer.

In some embodiments, a protective layer is arranged on a surface of the pattern layer deviating from the flexible base.

In a second aspect, the present disclosure provides a bottle that includes a bottle body and the flexible label described above. The flexible label is connected to an outer surface of the bottle body and is bent by force to form an outer contour matching a contour of the bottle body.

In some embodiments, the flexible label is melded and connected to the surface of the bottle body, or the flexible label is bonded on the surface of the bottle body.

Beneficial effects: In the present disclosure, a flexible label is arranged on the bottle body. When the user holds the bottle and squeezes out the drink, the squeezing force is cushioned by the flexible base, and the grip is more comfortable. A pattern layer is arranged on the surface of the flexible base to make the surface pattern of the bottle richer and more beautiful, which can attract more consumers and improve their consumption will. The side edges of the width direction of the flexible base are configured to curve-shaped, so that when the flexible base is arranged on the bottle body, the two side edges of the flexible base are orthographically projected as straight lines in a vertical plane, so that the side shape of the whole label is neat. Visually, the label is neat to avoid the illusion of poor product quality for consumers, improve the appearance quality, and improve the consumer's experience.

BRIEF DESCRIPTION OF THE DRAWINGS

In order to provide a clearer explanation of the embodiments of the present disclosure or the technical solutions in the prior art, a brief introduction to the drawings required for the description of the embodiments or the prior art in the following description is provided. It is evident that the drawings described below are some embodiments of the present disclosure. These drawings and accompanying descriptions are not intended to limit the scope of the present disclosure in any way, but rather to illustrate the concepts of the present disclosure to those skilled in the art by reference to embodiments. For those skilled in the art, additional drawings can be obtained based on these drawings without the exercise of creative labor.

Explanation of reference labels: 100—flexible label; 110—flexible base; 111—end segment; 112—concave segment; 120—textured structure; 130—pattern layer; 140—protective layer; 150—side edge; 200—bottle body.

DETAILED DESCRIPTION OF EMBODIMENTS

The present disclosure provides a flexible label. To make the purposes, technical solutions and effects of the present disclosure clearer and more definite, more details of the present disclosure are further described in combination with the attached drawings and the embodiments of the present disclosure. It should be understood that the specific embodiments described herein are used only to explain the present disclosure and are not intended to limit the present disclosure.

The existing soft rubber structure is usually injection molded, and directly injection molded into a curved surface that matches with an outer contour of the bottle body, so that the curved surface of the flexible rubber is directly matched with and connected to the curved outer contour of the bottle body. Therefore, in one aspect, the side edge becomes bent in the length direction in front view, which affects the user's experience and leads to decreased sales. In another aspect, it is not conducive to setting a pattern layer on a surface of the curved flexible rubber, which affects the production efficiency. Therefore, the present disclosure solves the above problems by the following embodiments.

Embodiment 1

Figure 1:
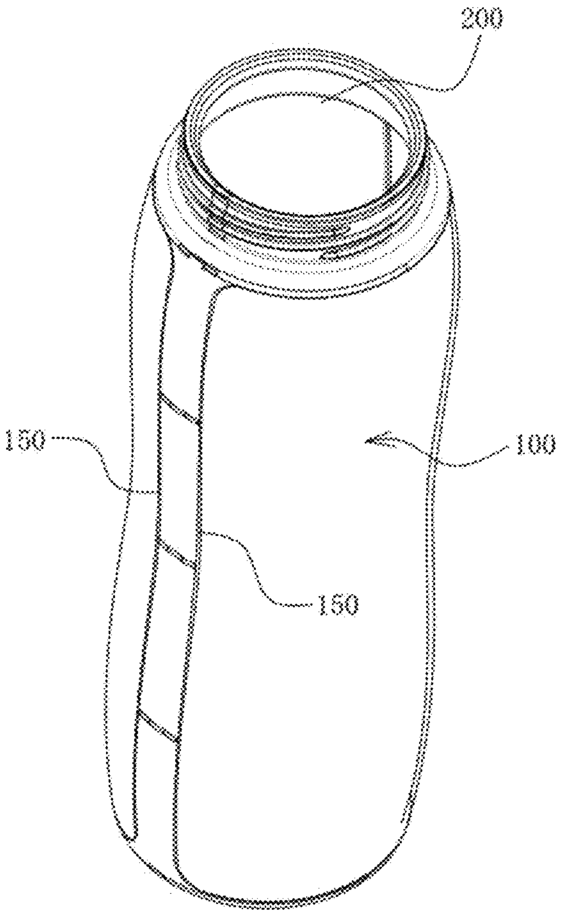
FIG. 1 is a structural schematic diagram of a bottle of the embodiment in the present disclosure.
Figure 2:
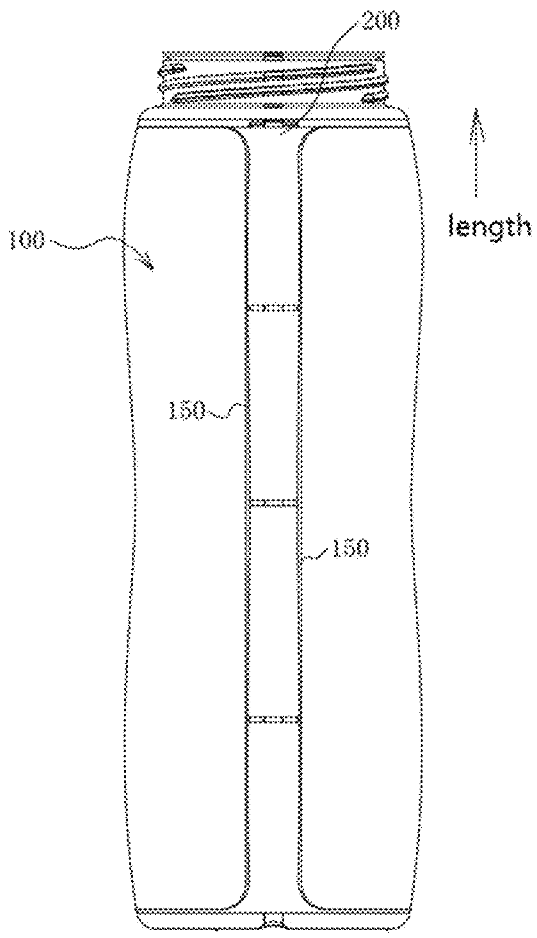
FIG. 2 is an orthographic projection view of the bottle in a vertical plane of the embodiment in the present disclosure.
Figure 3:
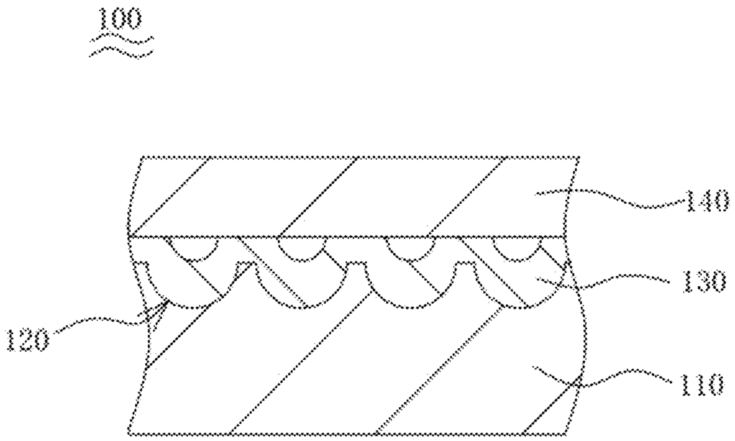
FIG. 3 is a cross-sectional schematic diagram of a flexible label of the embodiment in the present disclosure.

As shown in FIG. 1, the present embodiment provides a flexible label 100 arranged on a bottle body 200. To facilitate the structure description, a height direction of the bottle body 200 is taken as a length direction, and a circumference direction of the bottle body 200 is taken as a width direction. Usually, a cross-section of the bottle body 200 is irregularly curved in the length direction. The flexible label 100 is arranged on an outer surface of the curved surface of bottle body 200 to improve the appearance of the bottle and comfortable of the user's grip. As shown in FIG. 3, the flexible label 100 mainly includes a flexible base 110 and a pattern layer 130. The flexible base 110 is arranged on an outer wall of the bottle body 200, and the flexible base 110 can be a flexible rubber sheet. The pattern layer 130 is arranged on an outer surface of the flexible base 110, and the pattern layer 130 can be covered on the flexible base 110 by printing, spraying, thermal transfer, etc. The pattern layer 130 can cover the outer surface of the whole flexible base 110, thereby enhancing the appearance of the bottle body 200. The pattern layer 130 can also partially cover the flexible base 110. As shown in FIG. 2, two side edges 150 in the width direction of the flexible base 110 are configured to curve-shaped so that the two side edges 150 of the flexible base 110 arranged on the bottle body 200 are orthographically projected as straight lines in a vertical plane, and the vertical plane is the plane through a rotation centerline of the bottle body 200. Thus, when viewed from a side of the bottle, the orthographic projection of the side edge 150 of the flexible label 100 on the vertical plane is a straight line in the length direction.

As shown in FIG. 2 and FIG. 3, the use principles and effects of the flexible label 100 are as follows: the flexible base 110 is arranged on the bottle body 200, so that when the user holds the beverage bottle and squeezes out the beverage, the squeezing force is cushioned by the flexible base 110, and the grip is more comfortable. The pattern layer 130 is arranged on the surface of the flexible base 110, making the surface pattern of the bottle richer and the appearance more beautiful, which can be more attractive to consumers and improve their consumption will. The two side edges 150 in the width direction of the flexible base 110 are configured to curve-shaped, thereby when the flexible base 110 is arranged on the bottle body 200, the orthographic projections of the two side edges 150 of the flexible base 110 are straight on the vertical plane, so that the side shape of the whole label is neat. Visually, the label shape is neat, to avoid the illusion of poor product quality for consumers, improve the shape quality at the same time, and improve the use feeling of consumers.

Figure 4:
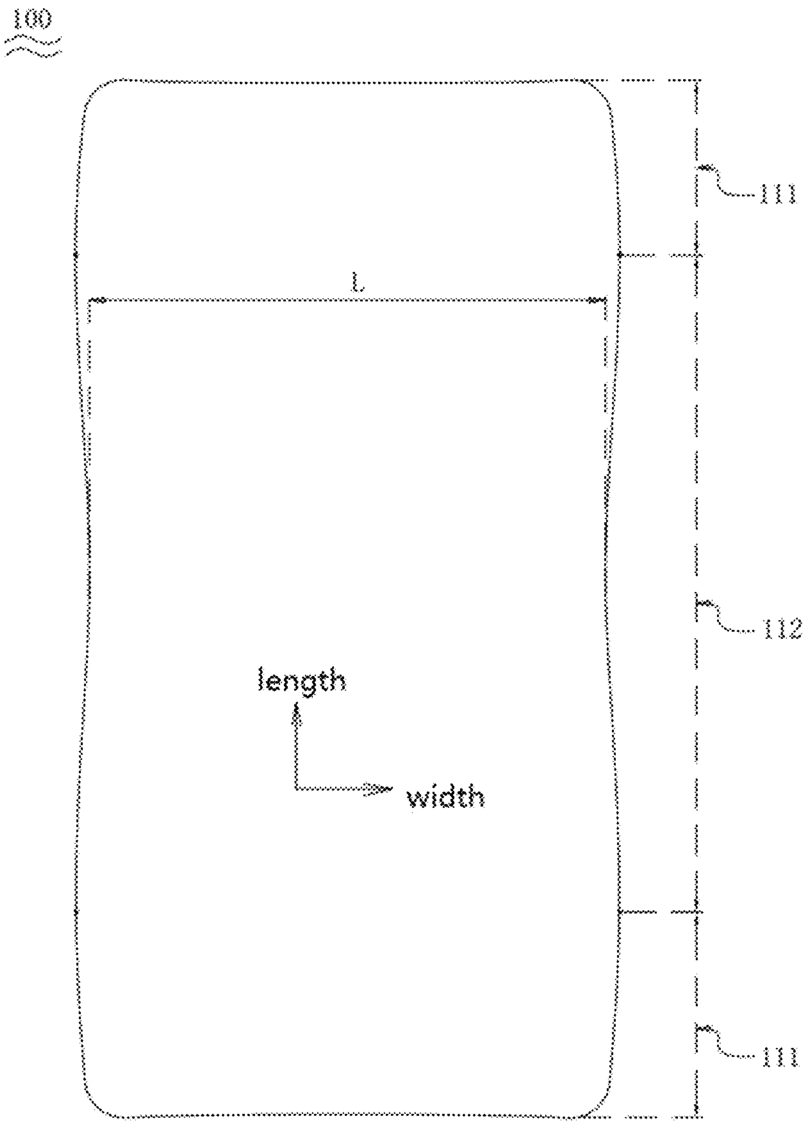
FIG. 4 is a top view of the flexible label in an unfolded state of the embodiment in the present disclosure.

Furthermore, as shown in FIG. 4, the flexible base 110 in the embodiment presents different states during production and being covered on the bottle body 200. When produced separately, the flexible base 110 is naturally tiled without the action of external forces and presents an unfolded state. In the unfolded state, the outer surface of the flexible base 110 is flat. The unfolded state of the flexible base 110 is formed after injection molded, so when the pattern layer 130 is arranged on the flexible base 110 with flat outer surface, more diverse process methods can be adopted. For example, printing, engraving or thermal transfer on the plane is easier to achieve than the existing injection molded curved flexible substrate, and the pattern layer 130 has higher forming efficiency, good effects, more feasible schemes and stronger practicability.

As shown in FIG. 1, the flexible base 110 presents a bending state after connected to the outer wall of the bottle body 200. In the bending state, the flexible base 110 is bent under the action of external force, and is fitted with the outer wall of the bottle body 200 to form a curved shape matching the outer wall of the bottle body 200.

Furthermore, as shown in FIG. 4, the specific shape of the side edge 150 in the width direction of the flexible base 110 in the embodiment includes two end segments 111 and a concave segment 112. In the unfolded state, the two end segments 111 are located at two ends of the length direction of the flexible base 110 and the contours of the two end segments 111 are also curved-shaped. The concave segment 112 is arranged between the two end segments 111 and connected to the two end segments 111. The upper end and lower end of the concave segment 112 are respectively connected with the two end segments 111 on both sides, and the concave segment 112 is bent toward a center of the flexible base 110. In the embodiment, the dimensions of the two end segments 111 are the same, and the minimum distance (L) of the concave segment 112 between two sides in the width direction is less than 111 mm.

As shown in FIG. 1, furthermore, a shape of bottle body 200 matching the flexible label 100 is thin in the middle and thick at both ends. The shape is more in line with the human use habits. When using the bottle, the user usually holds the middle segment, and the middle is thin, easy to grip, and the two ends are thick to increase the volume. In particular to sports water bottles, users usually need to squeeze out water when drinking water, so the thin structure in the middle is more convenient for users to squeeze the bottle body 200. The side edges 150 of the flexible base 110 adopt the outer contour form of the two end segments 111 and the concave segment 112, which can be matched with the structure of the bottle body 200, so that the orthographic projection of the side edges 150 of the flexible base 110 on the vertical plane is a straight line, so that the side shape of the whole label is neat. Visually, the label shape is neat to improve the shape quality at the same time and improve the consumer's experience.

As shown in FIG. 3, furthermore, the surface of the flexible base 110 of the embodiment is provided with a textured structure 120, and a pattern layer 130 covers an upper surface of the textured structure 120. In the unfolded state, a uneven surface is formed on the outer surface of the flexible base 110 by the textured structure 120, thus making the whole surface of the flexible label 100 uneven. A textured pattern is formed by the textured structure 120 to improve the visual hierarchy of the surface of the flexible label 100 and make the surface of the bottle body 200 more textured, thus enhancing the user's visual feeling. In addition, the textured structure 120 also increases the surface friction of the flexible label 100. When the flexible label 100 is covered on the bottle body 200, the user's feel of holding the bottle body 200 is increased and the use of comfort is improved.

Furthermore, as shown in FIG. 3, the textured structure 120 in the embodiment is an embossed concave-convex structure or a laser concave-convex structure formed on the surface of flexible base 110. In the unfolded state, the outer surface of the flexible base 110 is flat, so the embossing wheel can be used for embossing (knurling), and by the extrusion of the embossing wheel, a unified embossing pattern is formed on the outer surface of the flexible base 110, so that the outer surface of the flexible base 110 is uneven. In addition, the textured structure 120 can also be made by laser engraving, also in the unfolded state, the outer surface of the flat flexible base 110 can be carved into various hole structures by laser, so as to form a unified texture shape on the outer surface of the flexible base 110, so that the outer surface of the flexible base 110 is uneven.

As shown in FIG. 3, furthermore, the flexible base 110 in the embodiment is a thermoplastic elastic base. The flexible base 110 is made by injection molding of thermoplastic elastic material (TPE). The material has the characteristics of both plastic and rubber, performing the high elasticity of rubber at room temperature, and can be plasticized at high temperature. Therefore, when the flexible label 100 is connected to the plastic bottle body 200, the fixed connection between the flexible label 100 and the plastic bottle body 200 can be realized directly by hot melting, without the need for additional adhesives. Furthermore, the flexible base 110 can also be a rubber base or a silicone base.

The flexible base can be produced by using a mold production process such as extrusion molding, injection molding or compression molding.

Further, as shown in FIG. 3, the hardness of the flexible base 110 is Shore A 30-80 degree. The flexible base 110 with the hardness characteristic has good softness and improves the comfort of holding when the user holds it. Moreover, the deformation performance is good and easy to deform by external squeezing force, so as to match and connect with the outer contour of the bottle body 200. The flexibility of the flexible base 110 is strong, and the deformation of the flexible base 110 can form a more complex curved shape, so as to adapt to the more complex outer surface contour of the bottle body 200.

Further, the pattern layer 130 in the embodiment is a digital print pattern layer, an ink print pattern layer, a spray pattern layer, or a thermal transfer pattern layer. Since the outer surface of the flexible base 110 is flat in the unfolded state, various printing methods can be used to make pattern layer 130 on the surface of the flexible base 110, so that the production mode of pattern layer 130 can be diversified, and the processing mode can be reasonably selected according to the type of order in actual production, so as to improve production efficiency and production quality.

Further, as shown in FIG. 3, the pattern layer 130 in the embodiment is provided with a protective layer 140 on a surface deviating from the flexible base 110. The transparent protective layer 140 can be a transparent film. By setting a transparent film in the outermost layer, the pattern layer 130, especially the printed pattern layer 130 can be protected to prevent the pattern layer 130 from falling off. Especially during transportation, the pattern layer 130 and the flexible label 100 are more effectively protected by the protective layer 140.

Embodiment 2

As shown in FIG. 1 and FIG. 3, the present disclosure provides a bottle including a bottle body 200 and at least one flexible label 100 described in Embodiment 1. The flexible label 100 is connected to an outer surface of the bottle body 200 and is squeezed to form an outer contour matching the contour of the bottle body 200. In the process of blow molding of the bottle body 200, the flexible label 100 can be arranged in a mold to form deformation under the action of squeezing force, so as to form a complex surface contour matching the outer contour of the bottle body 200 to achieve a matching connection with the bottle body 200.

Further, the flexible label 100 in the embodiment may be connected to the surface of the outer wall of the bottle body 200 in a variety of ways. Specifically, the flexible label 100 is melded and connected to the surface of the bottle body 200, or the flexible label 100 is bonded on the surface of the bottle body 200.

Because the flexible base 110 is made of thermoplastic elastomeric material (TPE), when the flexible label 100 is connected to the plastic bottle body 200, the flexible label 100, and the plastic bottle body 200 can be fixedly connected directly by hot melting.

In addition, a back of the flexible base 110 can also be coated with adhesive, and under the external squeezing force, the flexible base 110 is bonded to the surface of the bottle body 200 by the adhesive.

In summary, the present disclosure provides a flexible label and a side edge of the width direction of the flexible base is configured to a curved shape. Thus, when the flexible base is arranged on the bottle body, the orthographic projection of the side edge of the flexible base on the vertical plane is a straight line, so that the side shape of the whole label is neat. Visually, the label shape is neat to avoid the illusion of poor product quality for consumers, improve the shape quality at the same time, and improve the consumer's experience In production, the outer surface of the flexible base is flat, so that the production of the pattern layer is more convenient, the production efficiency is improved, and the production cost is saved.

It should be understood that the implementations of the present disclosure are not limited to the above embodiments. For those skilled in the art, the present disclosure can be improved or transformed according to the above description. All these improvements and modifications should be included within the scope of protection of the claims attached to the present disclosure.

What is claimed is:

1. A bottle comprising:

a bottle body having a height direction, a width direction that is perpendicular to the height direction, and an outer wall having convex and concave curvature in the height direction;

a flexible label attached to the outer wall of the bottle body, the flexible label comprising:

a flexible base disposed on the outer wall of the bottle body, the flexible base comprising two opposing side edges spaced apart from each other in the width direction, each side edge comprising:

two curved end segments spaced apart from each other in the height direction, and disposed adjacent opposing upper and lower ends of the flexible base; and a concave segment disposed between and connected to the two curved end segments, the concave segment bent inward in the width direction; and a pattern layer disposed on an outer surface of the flexible base, wherein an orthographic projection of the two side edges of the flexible base onto a vertical plane that is perpendicular to a direction of projection comprises parallel straight lines.

2. The bottle according to claim 1, wherein the surface of the flexible base is arranged with a textured structure, and a pattern layer is covered on an upper surface of the textured structure.

3. The bottle according to claim 2, wherein the textured structure is an embossed concave-convex structure or a laser concave-convex structure.

4. The bottle according to claim 1, wherein the flexible base comprises a thermoplastic elastic base, a rubber base, or a silicone base; and a hardness of the flexible base is Shore A 30-80 degree.

5. The bottle according to claim 1, wherein the pattern layer comprises a digital printing pattern layer, an ink printing pattern layer, a spraying pattern layer, or a thermal transfer pattern layer.

6. The bottle according to claim 5, wherein a protective layer is disposed on a surface of the pattern layer.

7. The bottle according to claim 1, wherein the flexible label is bent by force to form an outer contour matching a contour of the outer wall of the bottle body.

8. The bottle according to claim 7, wherein the flexible label is melded and connected to the outer wall of the bottle body, or the flexible label is bonded on the outer wall of the bottle body.

* * * * *